UNITED STATES PATENT OFFICE.

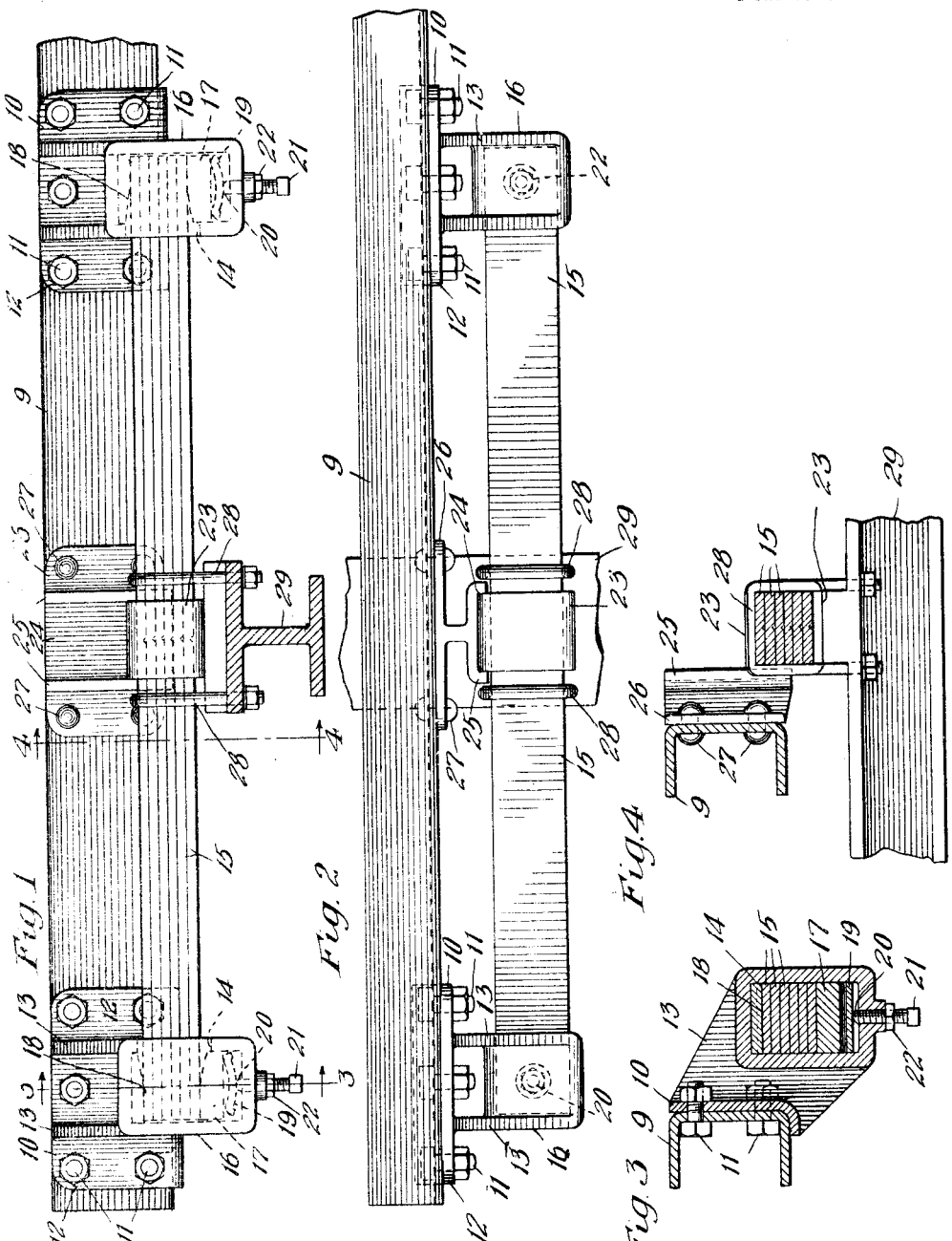

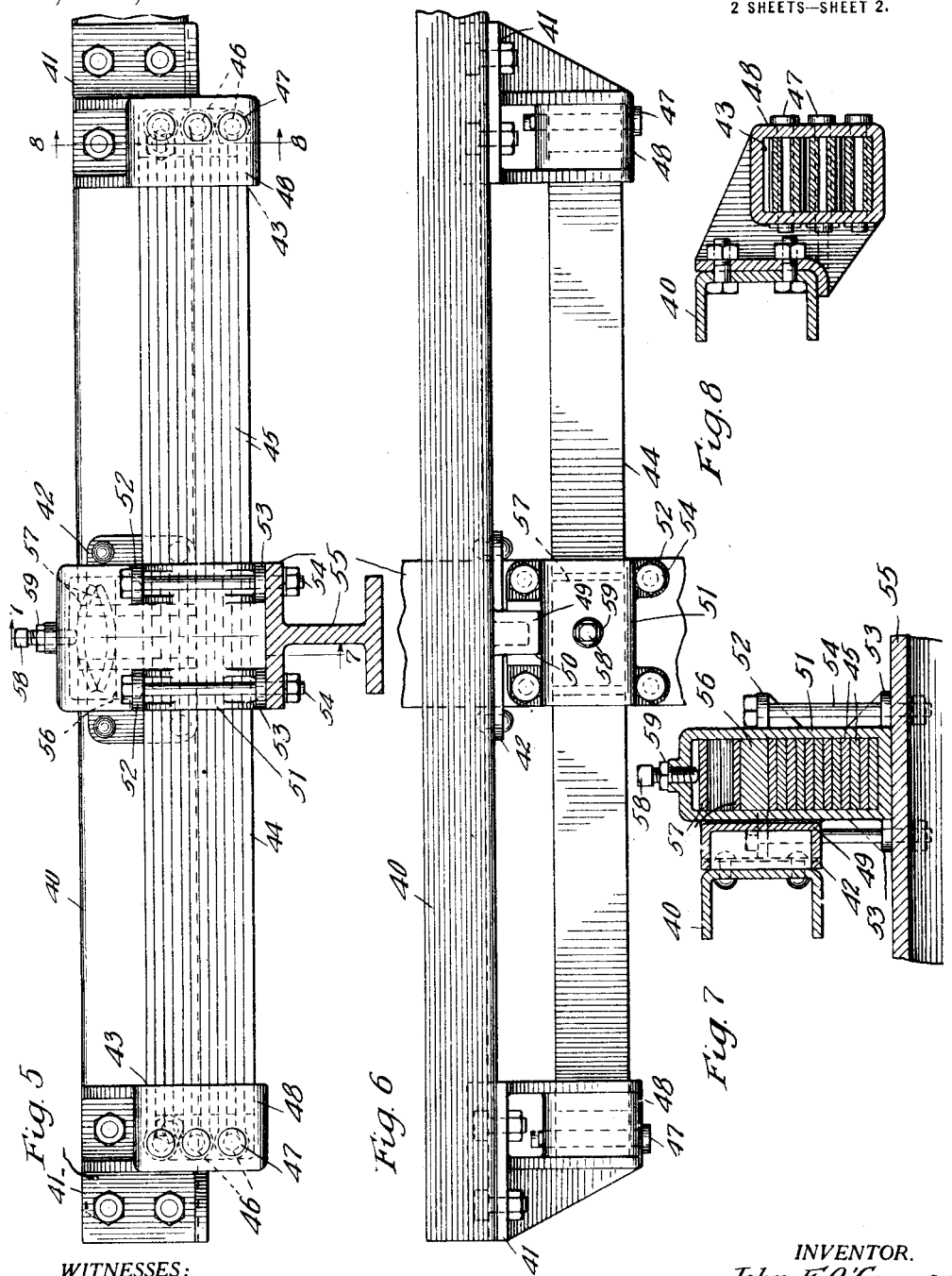

JOHN F. O'CONNOR, OF CHICAGO, ILLINOIS, ASSIGNOR TO WILLIAM H. MINER, OF CHAZY, NEW YORK.

LEAF-SPRING.

1,180,417. Specification of Letters Patent. Patented Apr. 25, 1916.

Application filed October 22, 1914. Serial No. 867,946.

*To all whom it may concern:*

Be it known that I, JOHN F. O'CONNOR, a citizen of the United States, residing at Chicago, in the county of Cook and State of Illinois, have invented a certain new and useful Improvement in Leaf-Springs, of which the following is a full, clear, concise, and exact description, reference being had to the accompanying drawings, forming a part of this specification.

My invention relates to improvements in leaf springs.

The object of my invention is to provide a friction leaf spring for vehicles.

In the drawings forming a part of this specification, Figure 1 is a side elevation of a portion of a frame of a vehicle with a friction leaf spring attached, embodying my invention. Fig. 2 is a plan view thereof. Fig. 3 is a cross section taken on line 3—3 of Fig. 1. Fig. 4 is a cross section taken on line 4—4 of Fig. 1. Figs. 5 to 8 inclusive illustrate a modification, Fig. 5 being a side elevation of a portion of a vehicle frame, with the friction leaf spring attached, embodying my invention in its modified forms. Fig. 6 is a plan view. Fig. 7 a cross section taken on line 7—7 of Fig. 5 and Fig. 8 is a cross section taken on line 8—8 of Fig. 5.

Referring to the drawings, and first to the preferred embodiment of my invention, as illustrated in Figs. 1 to 4 inclusive thereof, the numeral 9 indicates a portion of a vehicle frame having the brackets 10—10 suitably spaced apart secured thereto, preferably by the bolts 11—11, passing through said frame and the flanges 12—12 of the said brackets. Intermediate the flanges, the brackets 10—10 are each provided with the outwardly projecting flanges 13—13, each having a transverse opening 14 therethrough to receive the ends of a plurality of leaf springs 15—15. The leaf springs 15—15 are preferably flat plates of substantially the same dimensions, a plurality of which I will at times hereinafter refer to for convenience as a leaf spring. The leaf spring at its ends is received within the openings 14 in the brackets 13, the said openings in each of the brackets being in preferable construction closed on their outer faces by the preferably integral walls 16—16. Within the recess thus formed in each of the brackets is mounted an adjustable block 17, between which and the opposite wall 18 of the bracket the leaf spring 15 is received. Back of the adjustable block 17 is mounted a short spring 19, which is engaged against by the inner end 20 of a set screw 21. The set screw 21 is provided with a lock nut 22. Intermediate its ends the leaf spring is provided with a band 23 surrounding the same and securely holding the leaves thereof together. The band on its face adjacent the vehicle frame, is received within a vertical groove 24 formed between the two upright projecting flanges 25—25 with which the bracket 26 is provided. The bracket 26 is secured to the frame 9 of the vehicle by suitable means, preferably the rivets 27—27. Downturned U-bolts 28—28, or other similar suitable means, are employed to secure the leaf spring intermediate its ends to the axle 29 of the vehicle. A rigid connection to the axle and a secure fastening together of the leaves 15—15 of the spring at substantially their longitudinal center is desirable. The leaf spring illustrated in the drawings is composed of straight leaves, which are preferred, though other shapes may be employed. The action of the springs is the same in either direction of movement of the frame of the vehicle in reference to the axle. The leaves 15—15 are on relative movement of the vehicle frame and the axle, in sliding frictional engagement with each other between the central band and the ends of the leaves at either side thereof. The amount of this friction can be changed by adjustment of the block 17 through the set screws 21. The band 23 slides in the groove 24 of the intermediate bracket and is adapted with the other parts of the device to resist longitudinal shocks.

In the modified form illustrated in Figs. 5 to 8 inclusive of the drawings, the numeral 40 indicates part of a vehicle frame having spaced apart brackets 41—41 secured thereto and an intermediate bracket 42. The end brackets 41 are provided with longitudinal openings 43 to receive the ends of a leaf spring 44, consisting of a plurality of preferably flat plates 45—45. Each of the plates is provided at one end with a suitable opening 46 to receive a pin 47 passing through the side walls 48—48 of the bracket and adapted to secure an end of each loop 45 in the said bracket. The series of springs 45—45 are thus secured alternately so that upon the application of pressure to the series intermediate its ends, the springs are in frictional engagement with each other throughout their length. The intermediate bracket 42 is provided with a vertical guide 49 operating in a vertical groove 50 in a spring band 51 which surrounds the springs 45—45 intermediate their ends, the spring band being provided preferably with perforated flanges 52 and 53, having vertical bolts 54 passing therethrough and through the flanges of the axle 55 to secure the springs thereto. An adjusting block 56 is mounted within the band and above the springs 45, the same being engaged by a spring 57, preferably of a short elliptical design, the said block and the pressure thereof upon the springs 45—45 being adjustable by means of the set screw 58 engaging the spring 57, the said set screw being provided with a locking nut 59. In this embodiment of my invention, the leaves of the spring are each secured at one end and the amount of friction between them upon flexing can be regulated within the central band in the manner hereinbefore described.

It will be apparent that the recoil of the spring may be regulated as is desired and reduced to a minimum; that the use of links and swinging connections between the body of a vehicle and the running gear is avoided; that longitudinal movement of the frame in reference to the axle is prevented, and that through the consequent reduction of the relative vertical action between the running gear and the body of a vehicle, the ease of riding is very greatly increased. It is also apparent that all the leaves or plates of the friction leaf spring may be of the same length, and duplicates, if desired, so that ready repairs can be made.

I claim:—

1. In a vehicle, the combination with a frame and axle, of brackets attached to one of said members, a plurality of plates forming a leaf spring, said brackets inclosing said spring and one of the brackets being provided with means to regulate the friction between the plates forming said spring.

2. In a vehicle, the combination with a frame and axle, of brackets attached to one of said members, a plurality of plates forming a leaf spring, said brackets inclosing said spring and one of the brackets being provided with a movable adjustment block to regulate the friction between the plates.

3. In a vehicle, the combination with a frame and axle, of brackets attached to one of said members, a plurality of plates forming a leaf spring, said brackets inclosing said spring and one of the brackets being provided with an adjustment block and a set screw to regulate the pressure of the adjustment block upon said plates and adjust the frictional engagement between said plates.

4. In a vehicle, the combination with a frame and axle, of brackets attached to one of said members, a plurality of plates forming a leaf spring, said brackets inclosing said spring and one of the brackets being provided with a movable adjusting block engaging said plates, a set screw and a spring interposed between the set screw and said block, the said block being adapted to regulate the friction between said plates.

JOHN F. O'CONNOR.

Witnesses:
  CARRIE G. RANZ,
  LUCILLE HIGGINS.